Jan. 24, 1956
A. H. MORGAN ET AL
2,731,905
MACHINE FOR PROCESSING SLICED MATERIAL
Filed Nov. 12, 1952
2 Sheets-Sheet 1
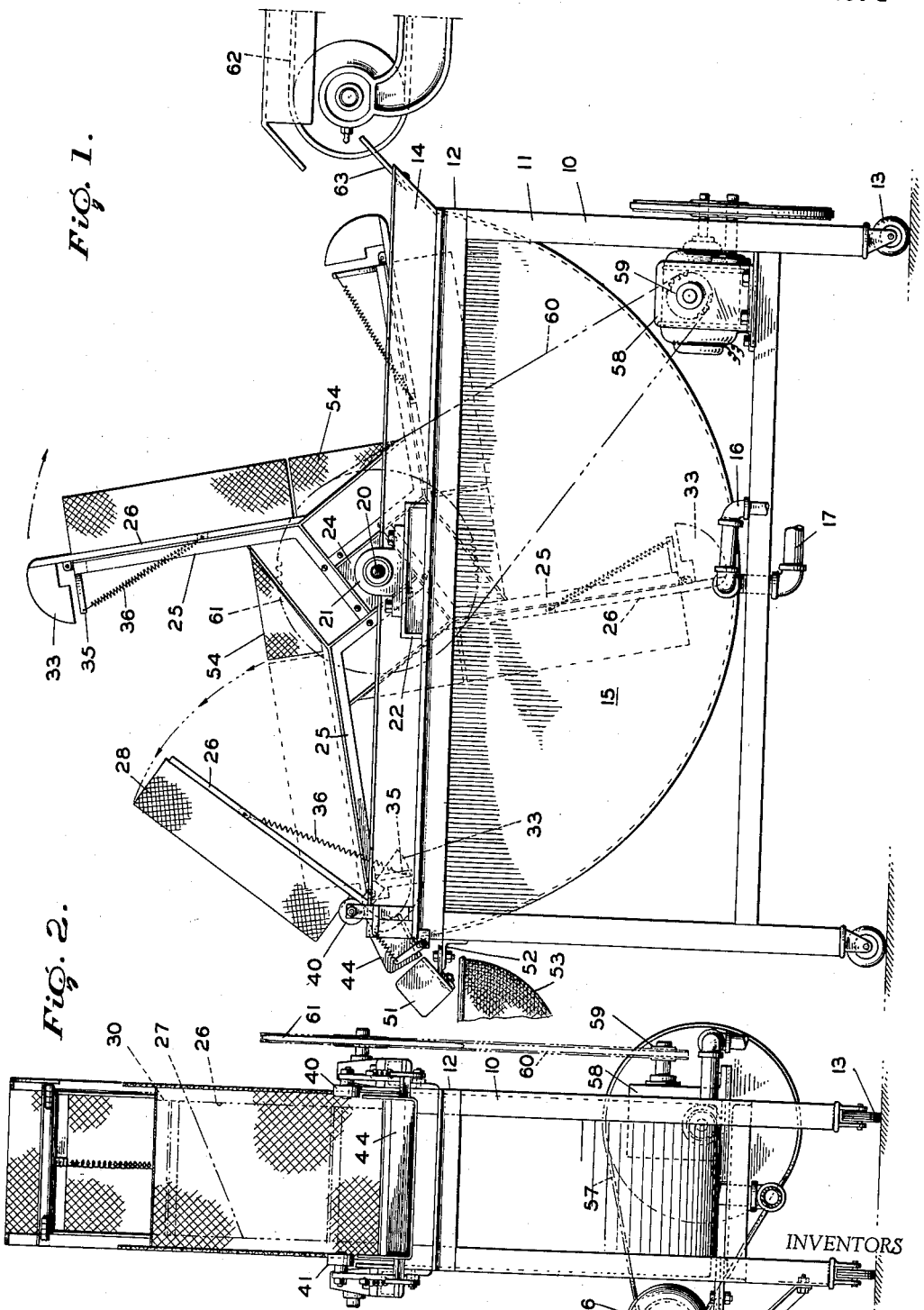
INVENTORS
Arthur H. Morgan
Guy A. Shuey
BY Cameron, Kerkam & Sutton
ATTORNEYS Jan. 24, 1956     A. H. MORGAN ET AL     2,731,905
MACHINE FOR PROCESSING SLICED MATERIAL
Filed Nov. 12, 1952     2 Sheets—Sheet 2
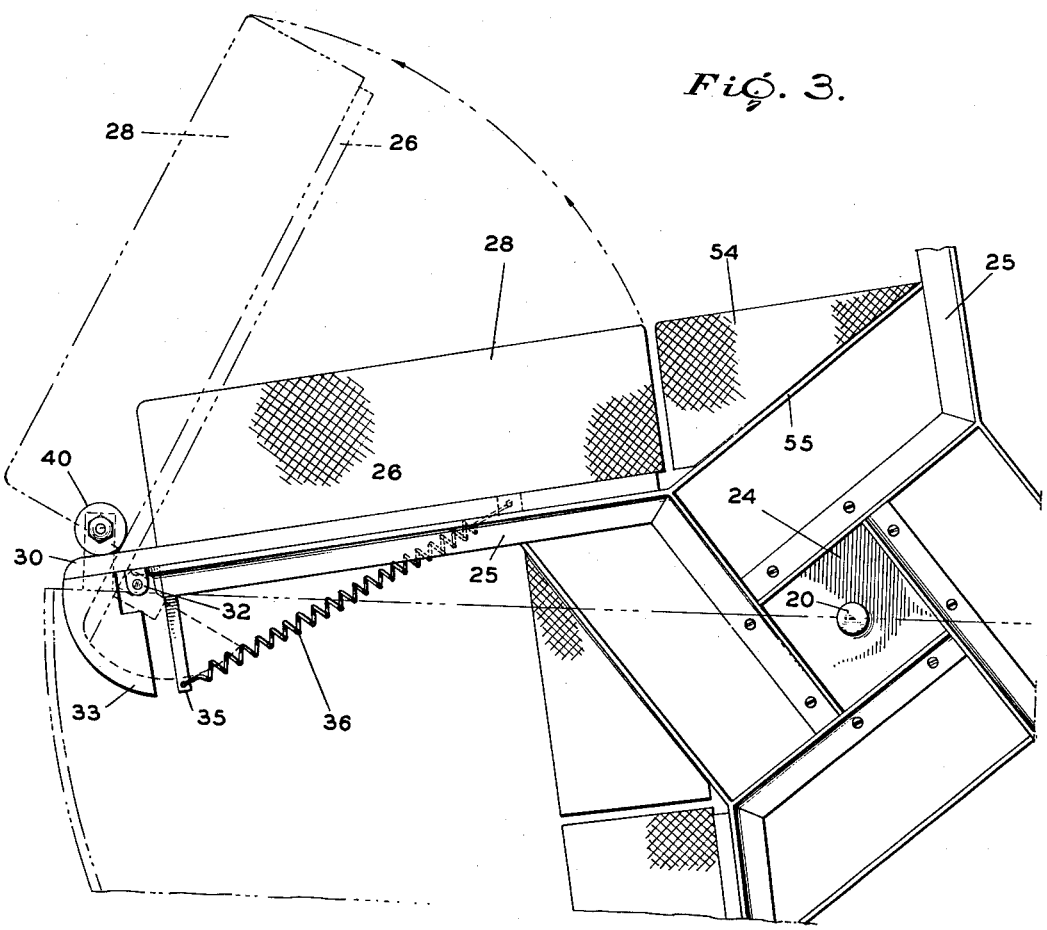
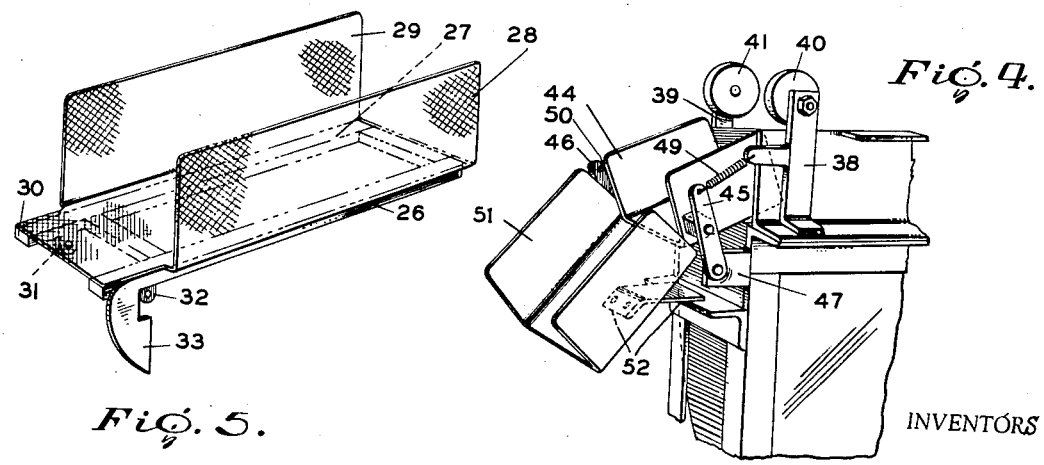
INVENTORS
Arthur H. Morgan
Guy A. Shuey
BY Cameron, Kerkam & Sutton
ATTORNEYS United States Patent Office 2,731,905
Patented Jan. 24, 1956

2,731,905

MACHINE FOR PROCESSING SLICED MATERIAL

Arthur H. Morgan and Guy A. Shuey, Knoxville, Tenn., assignors to The University of Tennessee Research Corporation, Knoxville, Tenn., a corporation of Tennessee Application November 12, 1952, Serial No. 320,074

10 Claims. (Cl. 99—239)

This invention pertains to an improved apparatus for treating sliced fruits and vegetables, prior to freezing, to prevent discoloration or browning thereof which detracts seriously from the appearance of the sliced material and may eventually render it unfit for human consumption.

It has been usual to treat such sliced fruit and vegetables, prior to freezing, with various harmless chemical compounds to retard and prevent this browning effect and deterioration. One example of such a solution is a solution of water saturated with carbon dioxide. Numerous other such solutions are well known in the art.

It has been usual in the past merely to immerse the sliced fruit, i. e., peaches, apples or other fruit, in a solution of the anti-browning chemicals for a period of time, the fruit then being hand dipped or ladled out of the solution, packaged and frozen. This method of treating the sliced fruit has proved to be most unsatisfactory and has resulted in considerable spoilage and in varying degrees of treatment of the slices. It has also necessitated a great deal of extraneous and unnecessary hand labor. At best this method of treating the sliced material has resulted in an unequally processed product in which a certain percentage of the slices has been over processed and an additional and large percentage has been under processed, resulting in an unsatisfactory product.

It is therefore a primary object of this invention to evolve a machine and method of processing sliced fruits and vegetables in such anti-browning solutions which will produce a uniformly processed product subjected to the solution for a predetermined length of time and in which each particle or slice is processed equally with each other particle or slice.

It is a further object of this invention to evolve such a machine in which the treatment of the slices is completely mechanical and automatic and which produces a completely uniform product.

A further object of this invention is to eliminate unnecessary handling of the sliced material and to evolve an improved product.

Other and further objects of this invention will become apparent as this specification proceeds.

Referring to the drawing,

Fig. 1 is a side view, partially in phantom, of an improved processing machine made in accordance with the present invention;

Fig. 2 is an end view of the improved machine taken from the discharge end thereof;

Fig. 3 is a partial side view, partially in phantom, of one of the arm and pivoted basket members of the rotor structure of the machine;

Fig. 4 is a detailed perspective view of the tripping and discharge structure provided at the discharge end of the tank of the machine; and Fig. 5 is a perspective view of one of the pivotally mounted basket frame structures for the rotor, showing the pivot points and the cam follower mounted below the extremity of the base members thereof.

In the drawings, Fig. 1, 10 indicates a rectangular frame structure preferably provided with four legs 11 and an upper rectangular frame 12 joining said legs 11, legs 11 being preferably provided with rollers 13 at their lower extremities to permit ready movement of frame 10.

Mounted longitudinally in rectangular frame 10 is semi-circular treating tank 15, which is preferably formed of metal or other appropriate material. At its upper feed end tank 15 is preferably provided with an outwardly extending annular flange 14 which serves to direct sliced material into the interior of the treating tank. At its opposite, discharge end the upper walls of tank 15 are brought inwardly into vertical, parallel relationship to assist in the ready discharge of the sliced contents of the tank. Treating tank 15 is preferably of considerably greater length than width and as shown is completely open to the atmosphere at its upper extremity. Treating tank 15 is preferably filled substantially to its top with an appropriate anti-browning solution for the treatment of sliced fruit or vegetables immersed therein, as will be hereinafter discussed in more detail.

Tank 15 is preferably provided with drains 16 and 17 at its lower extremity for the draining off of the solution when it is desired to clean the tank. It may also be provided with a jacket for the admission of steam for heating the treating solution if desired in the case of vegetable blanching and lye pealing of fruits and vegetables. Electric heaters or steam heating coils may be incorporated at strategic points in a single walled tank. A liquid level overflow may be added to tank 15 if it is desired to maintain a constant level of treating solution therein.

Mounted laterally across the center of tank 15 is rotor shaft 20 which is appropriately rotatably mounted in suitable end bearings 21 mounted on blocks 22 which are affixed to the central upper walls of tank 15. Rotatably mounted on shaft 20 is rectangular rotor hub 24, to the faces of which are appropriately affixed flattened arm or frame members 25. As shown, arm members 25 are preferably outwardly and angularly inclined from their base sections at an obtuse angle, for a purpose hereinafter to be discussed in more detail. As shown in Fig. 1, the rotor structure is designed for clockwise rotation through tank 15.

Pivotally attached to arms 25 at their outer extremities are basket or pusher frames 26, which, as shown in Fig. 5, preferably comprise a flat, rectangular bottom frame 27 covered over its entire upper surface with a heavy wire mesh screen and provided at its lateral extremities with upstanding, vertical wire mesh side walls 28 and 29 which are appropriately clamped or otherwise affixed thereto. As will be noted from Fig. 5, lateral wire mesh walls 28 and 29 terminate an appreciable distance from the outer extremities of bottom frame 27, leaving the outer end 30 of frame 27 free and unobstructed. Bored pivot points 31 and 32 are provided adjacent the outer extremity of the lateral arms of frame 27 and extend downwardly therebeneath. Curved cam follower member 33 is shown affixed beneath the outer extremity of one of the lateral arms of frame 27, outwardly of and extending downwardly from pivot point 32. As shown, cam follower 33 is smoothly curved about its outer periphery and is cut away at its upper, inner extremity adjacent pivot point 32. Basket frame 26 is preferably of slightly less length than the radius of tank 15, and is of slightly less width, to make a close, yet movable fit therein.

Basket or pusher frames 26 are preferably pivotally affixed by means of bored pivot points 31 and 32 and an appropriate bolt through the bored outer extremities of rotor arms 25. It will thus be seen that basket frames 26 are so pivotally affixed at the outer extremities of arms 25 as to be able to make an upward angular movement with respect thereto of approximately 45 to 50°.

Affixed below the outer extremity of arm 25 and extending downwardly therefrom is a short rectangular extension 35. Spring 36 is affixed between the lower extremity of extension 35 and the inner lower extremity of basket frame 26 in such fashion that spring 36 will hold basket frame 26 firmly yet yieldably against arms 25 when the outer extremities 30 of basket frame 26 are free of obstructions.

Mounted adjacent the discharge extremity of tank 15 and extending upwardly therefrom are roller brackets 38 and 39, at the upper inner extremities of which are rotatably mounted cylindrical rollers 40 and 41. Rollers 40 and 41 are designed to contact the outer free extremities 30 of basket frame 26 as arm 25 moves upwardly to tilt basket frame 26 thereagainst, as will be hereinafter discussed in more detail.

Pivotally attached adjacent the discharge end of frame 10, beneath rollers 40 and 41 and inwardly thereof, is auxiliary discharge chute 44, which as shown is slidably mounted between the vertical extremities of lateral walls 14 of tank 15 by means of pivot members 45 and 46. Auxiliary discharge chute 44, as shown, is preferably in the form of an open rectangular segment and is fixedly attached at its medial outer extremities to pivot arms 45 and 46. Pivot arms 45 and 46 are preferably pivotally attached at their lower extremities to extensions 47 which extend outwardly from the upper terminal extremities of frame 10. Springs 49 and 50 preferably are disposed between the upper extremities of pivot members 45 and 46 and extensions of uprights 38 and 39 of rollers 40 and 41 in such fashion that springs 49 and 50 tend to urge auxiliary chute 44 inwardly beneath rollers 40 and 41, for a purpose hereinafter to be discussed in more detail.

Discharge chute 51 is shown fixedly mounted adajcent the outer extremity of auxiliary discharge chute 44 at the upper terminal extremity of frame 10 by means of a bracket 52 which is affixed to the upper outer extremity of frame 10. As shown, discharge chute 51 is preferably downwardly inclined at an angle of approximately 45° and is designed to direct the contents of tank 15 into an appropriate receptacle 53 as they are scooped therefrom by basket frames 26 at the end of their passage through tank 15. As shown, discharge chute 51 is preferably in the form of an open, rectangular chute formed of metal or other appropriate material.

Referring again to the rotor and arm structure of the mechanism it will be noted that adjacent the inner extremity of basket frame 26 there is a fixed and immovable wire mesh segment 54 which extends between the base portion of one arm member 25 and the lower edge of the adjacent arm member 25. Angular mesh segment 54 is provided to accommodate excess sliced material which may be forced to the inner extremity of the basket frame structure and is provided with a downwardly inclined angular bottom 55 to enable this excess sliced material to slide freely into main basket frame 26 at the discharge end of the machine. Angular segment 54 also acts to force slices at the surface of the bath through the bath.

The drive for the machine, which is conventional, will now be briefly described. Motive force for the rotation of the rotor structure is provided by a small electric motor 56 through a belt 57 to a speed reducer unit 58. Small gear 59 of speed reducer unit 58 is connected by an appropriate chain drive 60 to a large gear 61 which is affixed to the outer extremity of rotor shaft 20 in such fashion that rotation imparted to drive gear 61 will be translated to shaft 20 and to the rotor structure.

As has been hereinbefore stated, the improved machine is designed to treat sliced fruit or vegetables which are appropriately directed into tank 15 as by an endless belt conveyor 62 shown at the upper right hand section of Fig. 1 of the drawing. Endless belt 62 communicates between the slicing machine and the feed extremity 63 of tank 15 in such fashion that a contiuous flow of sliced material is directed into tank 15 by belt 62, the sliced material falling into tank 15 from belt 62 by gravity.

The rotation of rotor arms 25 and baskets 26 through tank 15 is preferably quite slow, i. e., on the order of one complete rotation every two minutes. This period of rotation and the resultant period of immersion of the slices or particles in the treating bath contained in tank 15 may be varied as desired, depending upon the nature of the sliced material being treated and the nature of the treating solution.

As will be seen from Fig. 1 the terminal extremities of basket frames 26 make a very close clearance with the internal, curved bottom wall of tank 15 to assure the forcing through tank 15 by basket frames 26 of all of the sliced fruit or particles contained therein. Likewise, the lateral walls 28 and 29 of basket frames 26 make a very close clearance with the lateral walls of tank 15 to prevent the escape of sliced particles at the edges of frame 26.

The operation of the device is as follows:

With the slicing machine in operation and the belt 62 transmitting sliced fruit to the feed end 63 of treating tank 15, motor 56 is energized, initiating rotation of the rotor structure and basket frames 26 through tank 15. As before stated, the rotation of the rotor structure through tank 15 is quite slow, i. e., on the order of one complete rotation every two minutes. Thus it will be seen that as the sliced material falls into tank 15 from belt 62 it will shortly be contacted by one of the basket frames 26 rotated on arm 25 and the mass of sliced material will be forced slowly through the solution in tank 15 by basket frame 26 through approximately 180° of the movement of the basket frame through tank 15. As the arm 25 carrying the pivoted basket frame 26 reaches the outer upper end of tank 15 and after the arm 25 has cleared the upper surface of tank 15 the outer extensions or extremities 30 of basket frame 26 will impinge against rollers 40 and 41, after having first impinged against the inner edge of auxiliary chute 44, and with the continued upward clockwise rotation of arm 25 the basket frame 26 will be tilted against rollers 40 and 41, inclining basket frame 26 ever further upwardly until the extremities of extensions 30 thereof slide clear of rollers 40 and 41. This ever-increasing upward inclination of basket frame 26, against the spring tension of spring 36 connecting its lower edge with arms 25, will completely discharge from basket frame 26 into auxiliary chute 44 and chute 51 the entire treated contents of basket frame 26. As the terminal extremities 30 of basket frame 26 clear the rollers 40 and 41 the semi-circular cam follower 33 will impinge against the lower surface of outer roller 40 and as upward rotation of arm 25 continues the curved outer surface of cam follower 33 bearing against roller 40 will allow spring 36 to gradually retract basket frame 26 back into close contact with arms 25 whereby after the lower extremity of cam follower 33 has cleared roller 40 basket frame 26 will be again firmly seated upon arms 25.

As illustrated in the drawings, the rotor hub 24 is preferably provided with four angular arm members 25, each of angular arm members 25 being provided with a pivoted basket frame structure 26, as previously described. The number of arms 25 and basket frames 26 may be varied as desired, depending upon the nature of the material being treated and the length of time desired for the treatment thereof.

It will be seen by an inspection of the feed end of the structure that a slight clearance is provided between the outer extremities of basket frames 26 and the feed end of tank 15. If any of the sliced material should fall upon the upper surface of a basket frame 26 as it enters the bath in tank 15 this material will fall off into the bath as arm 25 moves downwardly and will be picked up by the succeeding basket frame and forced through the bath thereby. At the discharge end of tank 15 basket frames 26 scoop up the sliced material as they leave the bath, side walls 28 and 29 preventing the sliced material from escaping at the sides of basket frames 26 prior to dumping.

With respect to the auxiliary chute structure 44, it will be seen that as the outer extremities 30 of basket frame 26 are brought upwardly out of the bath by arm 25 they will first impinge against the lower inner edge of auxiliary chute 44, forcing it outwardly against the tension of springs 49 and 50 about the pivot rods 45 and 46 into conjunction with the upper extremity of chute 51 to provide a complete closed exit chute for the sliced particles as they fall by gravity out of basket frame 26. Auxiliary chute 44 is further held in its outer extended position by the outer surface of cam 33 until rotation of arm 25 clears the outer surface of cam 33 therefrom. After contact is discontinued springs 49 and 50 will retract auxiliary chute 44 under rollers 40 and 41 until the succeeding frame 26 reinitiates the discharge cycle.

The angularity of arms 25 is important as it provides an extremely sharp angle of emergence for each of the basket frames 26 out of the treating bath, forcing the sliced contents of each basket frame 26 to the outer extremity of the basket prior to dumping, which results in an initial drainage of the sliced produce and a more rapid dumping thereof than would result if the sliced products were distributed throughout the entire length of the basket frame.

The action of the basket frame structures 26, from the feed end of tank 15 to its discharge end, is first to force the mass of sliced material through the bath in tank 15, whereby the sliced material is thoroughly treated with the anti-browning solution, and then, at the discharge end of the tank, to scoop up the treated material and dump it into the discharge chutes.

As has been previously stated, the tank 15 is preferably substantially filled to its upper extremity with the treating solution. The level of the solution in the tank may be controlled by a liquid level overflow, if desired.

The structure as illustrated was primarily designed for the treatment of sliced peaches and apples, but it may be utilized for the treatment of any analogous material.

The dimensions of the tank and rotor structure may be varied as desired, depending upon the nature of the product being treated and the length of treatment thereof. The present machine incorporates a semi-circular tank 2 feet in radius, 4 feet in length and 1 foot in width, however, these dimensions may be varied at will, as desired.

The foregoing specification is by way of illustration only. Modifications may be made in the structure within the scope of mechanical equivalents without departing from the spirit of the invention.

Attention is directed to the appended claims for a limitation of the scope of this invention.

What is claimed is:

1. In a machine for treating sliced fruit and analogous material, a frame, a semi-circular open tank supported in said frame, a treating bath in said tank, a rotor structure rotatably mounted across the upper center of said tank, arms extending outwardly from said rotor structure, rectangular, open basket frames supported on said rotor arms throughout their length and pivotally mounted at their outer extremities thereon for rotative movement through staid tank, tripping means supported above one extremity of said tank whereby said basket frames may be tilted with respect to said rotor arms as their outer extremities are engaged by said tripping means.

2. In a machine for treating sliced fruit and analogous material, a frame, a semi-circular open tank supported in said frame, a treating bath in said tank, a rotor structure rotatably mounted across the upper center of said tank, angular arms extending outwardly from said rotor structure, rectangular mesh basket frames supported for their entire length on said rotor arms and pivotally mounted at their outer extremities thereon for rotative movement through said tank, extensible spring means affixed between the lower extremities of said basket frames and said arms maintaining said basket frames in position on said arms, tripping means supported above one extremity of said tank whereby said basket frames may be tilted with respect to said rotor arms as their outer extremities are engaged by said tripping means.

3. In a treating machine for sliced fruit and vegetables, a frame, a semi-circular tank supported in said frame and open at its upper extremity, a rotatable shaft mounted across said frame above the center of said tank, a rotor hub mounted on said shaft, a series of obtusely angled arms affixed to and extending outwardly from said rotor hub for rotative movement through said tank, basket frames pivotally mounted at their outer extremities on each of said arms and resting for their entire length on the upper surface of said arms, springs connecting the bottoms of said basket frames to said arms, roller members mounted above one extremity of said tank in position to contact the outer extremities of said basket frames, means provided on said frame to impart rotation to said rotor hub, a treating bath in said tank, whereby each of said basket frames will be angularly tilted above its arm when its extremities are brought into contact with said rollers.

4. In a treating machine for sliced fruit and vegetables, a frame, a semi-circular tank supported in said frame and open at its upper extremity, a rotatable shaft mounted across said frame above the center of said tank, a rotor hub mounted on said shaft, four obtusely angled arms affixed to and extending outwardly from said rotor hub for rotative movement through said tank, basket frames pivotally mounted at their outer extremities on each of said arms and resting for their entire length on said arms, roller members mounted above one extremity of said tank in position to contact the outer extremities of said basket frames, means provided on said frame to impart rotation to said rotor hub, a treating bath in said tank, whereby each of said basket frames will be angularly tilted above its arm when its extremities impinge against said rollers.

5. In a treating machine for sliced fruit and analogous material, a frame, a semi cylindrical tank disposed in said frame and open at its upper surface, a bath in said tank, a rotatable hub mounted across the upper center surface of said tank, a series of obtusely angled arms extending outwardly from said hub to a distance less than the radius of said tank, basket frames pivotally affixed at their outer extremities to said arms and normally lying along said arms, springs holding said basket frames normally in close contact with the upper surface of said arms, extended outer extremities on said basket frames, curved cam surfaces extending downwardly from the lower, outer extremities of said basket frames, pairs of rollers mounted above one extremity of said tank on said frame in position to be contacted by said extended outer extremities of said basket frames and by said cam surfaces carried thereby, means for imparting rotation to said hub mounted on said frame, whereby said basket frames will be tilted upwardly from said arms when rotation of said hub brings said extended extremities thereof into contact with said rollers.

6. In a treating machine for sliced fruit and analogous material, a frame, a semi cylindrical tank disposed in said frame and open at its upper surface, a bath in said tank, a rotatable hub mounted across the upper center surface of said tank, a series of outwardly and obtusely angled arms extending outwardly from said hub to a distance less than the radius of said tank, basket frames pivotally affixed at their outer extremities to said arms, and extending outwardly an appreciable distance therebeyond, springs holding said basket frames normally in close contact with the upper surface of said arms, extended outer extremities on said basket frames curved cam surfaces extending downwardly from the lower, outer extremities of said basket frames, pairs of rollers mounted above one extremity of said tank on said frame in position to be contacted by said extended outer extremities of said basket frames and by said cam surfaces carried thereby, means for imparting rotation to said hub mounted on said frame, whereby said basket frames will be tilted upwardly from said arms when rotation of said hub brings said extended extremities thereof into contact with said rollers.

7. In a treating machine for sliced fruit and analogous material, a frame, a semi cylindrical tank disposed in said frame and open at its upper surface, a bath in said tank, a rotatable hub mounted across the upper center surface of said tank, a series of outwardly and obtusely angled arms extending outwardly from said hub to a distance slightly less than the radius of said tank, rectangular, open basket frames pivotally affixed at their outer extremities to the outer extremities of said arms, springs affixed between said basket frames and said arms holding said basket frames normally in close contact with the upper surface of said arms, extended outer extremities on said basket frames, curved cam surfaces extending downwardly from the lower, outer extremities of said basket frames, pairs of rollers mounted above one extremity of said tank on said tank on said frame in position to be contacted by said extended outer extremities of said basket frames and by said cam surfaces carried thereby, means for imparting rotation to said hub mounted on said frame, whereby said basket frames will be tilted upwardly from said arms when rotation of said hub brings said extended extremities thereof into contact with said rollers.

8. In a treating machine for sliced fruit and analogous material, a frame, a semi cylindrical tank disposed in said frame and open at its upper surface, a bath in said tank, a rotatable hub mounted across the upper center surface of said tank, a series of outwardly and obtusely angled arms extending outwardly from said hub to a distance less than the radius of said tank, basket frames pivotally affixed at their outer extremities to said arms, springs between said basket frames and said arms holding said basket frames normally in close contact with the upper surface of said arms, extended outer extremities on said basket frames, curved cam surfaces extending downwardly from the lower, outer extremities of said basket frames, angular mesh basket segments affixed between said arms adjacent the inner extremities of said basket frames and communicating therewith, pairs of rollers mounted above one extremity of said tank on said frame in position to be contacted by said extended outer extremities of said basket frames and by said cam surfaces carried thereby, means for imparting rotation to said hub mounted on said frame, whereby said basket frames will be tilted upwardly from said arms when rotation of said hub brings said extended extremities thereof into contact with said rollers.

9. In a treating machine for sliced fruit and analogous material, a frame, a semi cylindrical tank disposed in said frame and open at its upper surface, a bath in said tank, a rotatable hub mounted across the upper center surface of said tank, a series of outwardly and obtusely angled arms extending outwardly from said hub to a distance less than the radius of said tank, basket frames pivotally affixed at their outer extremities to the extremities of said arms, springs affixed between the lower edges of said basket frames and the outer extremities of said arms normally holding said basket frames in close contact with said arms, extended outer extremities on said basket frames, curved cam surfaces extending downwardly from the lower, outer extremities of said basket frames, pairs of rollers mounted above one extremity of said tank on said frame in position to be contacted by said extended outer extremities of said basket frames and by said cam surfaces carried thereby, means for imparting rotation to said hub mounted on said frame, whereby said basket frames will be tilted upwardly from said arms when rotation of said hub brings said extended extremities thereof into contact with said rollers.

10. In a treating machine for sliced fruit and analogous material, a frame, a semi cylindrical tank disposed in said frame and open at its upper surface, a bath in said tank, a rotatable hub mounted across the upper center surface of said tank, a series of outwardly and obtusely angled arms extending outwardly from said hub to a distance less than the radius of said tank, basket frames pivotally affixed at their outer extremities to said arms, springs holding said basket frames normally in close contact with the upper surface of said arms, extended outer extremities on said basket frames, curved cam surfaces extending downwardly from the lower, outer extremities of said basket frames, rollers mounted above one extremity of said tank on said frame in position to be contacted by said extended outer extremities of said basket frames and by said cam surfaces carried thereby, means for imparting rotation to said hub mounted on said frame, whereby said basket frames will be tilted upwardly from said arms when rotation of said hub brings said extended extremities thereof into contact with said rollers.

References Cited in the file of this patent

UNITED STATES PATENTS

| 1,630,676 | Smith | May 31, 1927 |
| 1,993,609 | Kennedy | Mar. 5, 1935 |
| 2,512,640 | Greenspan et al. | June 27, 1950 |
| 2,592,563 | Hall et al. | Apr. 15, 1952 |
| 2,678,277 | Glabe | May 11, 1954 |

FOREIGN PATENTS

| 513,488 | France | Feb. 16, 1921 |